United States Patent [19]

Schmitz

[11] 4,100,932
[45] Jul. 18, 1978

[54] PIPE BURST SAFETY DEVICE FOR NATURAL GAS PIPE LINES OR THE LIKE

[75] Inventor: Hermann Schmitz, Haan, Fed. Rep. of Germany

[73] Assignee: P.D. Rasspe Soehne, Solingen, Fed. Rep. of Germany

[21] Appl. No.: 690,877

[22] Filed: May 28, 1976

[30] Foreign Application Priority Data

Sep. 19, 1975 [DE] Fed. Rep. of Germany ....... 2541734

[51] Int. Cl.² .............................................. F16K 31/12
[52] U.S. Cl. .................................... 137/488; 137/209
[58] Field of Search ............................. 137/488, 209

[56] References Cited

U.S. PATENT DOCUMENTS

| 2,707,483 | 5/1955 | Shafer | 137/488 X |
| 2,836,192 | 5/1958 | Shafer | 137/488 |
| 2,849,987 | 9/1958 | Shafer | 137/488 X |
| 3,788,341 | 1/1974 | Athy | 137/488 X |

*Primary Examiner*—Harold W. Weakley
*Attorney, Agent, or Firm*—Bacon & Thomas

[57] ABSTRACT

A pipe line has a check valve therein, operable by an actuator. The actuator is connected to be operated by fluid pressure from the pipe line, and is connected with the pipe line by a control circuit including valve means. A differential pressure valve is connected in the control circuit, and is constructed to sense a drop in pressure within the pipe line downstream of the control valve. Upon sensing such a pressure drop, the differential pressure valve is effective to cause connection of the actuator to pipe line pressure upstream of the check valve, whereby the latter is automatically closed.

5 Claims, 3 Drawing Figures

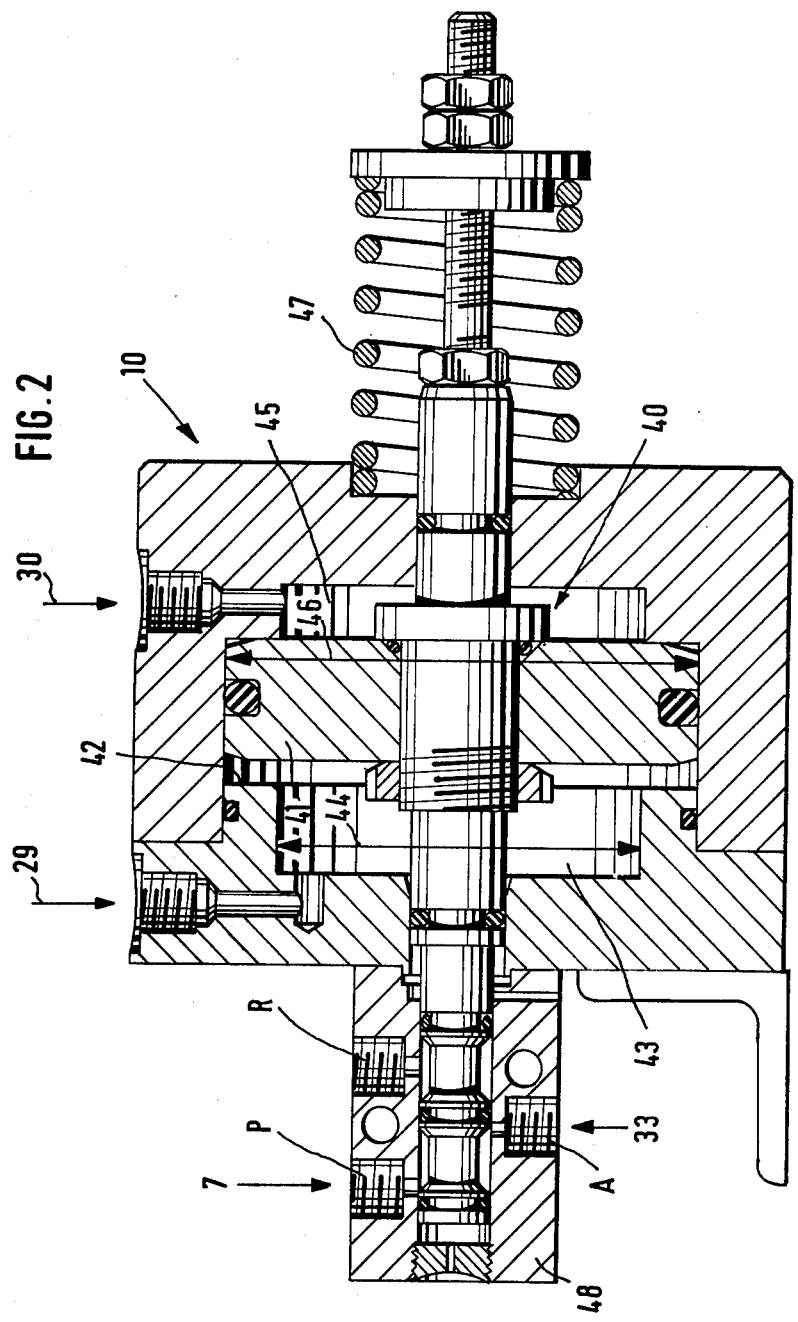

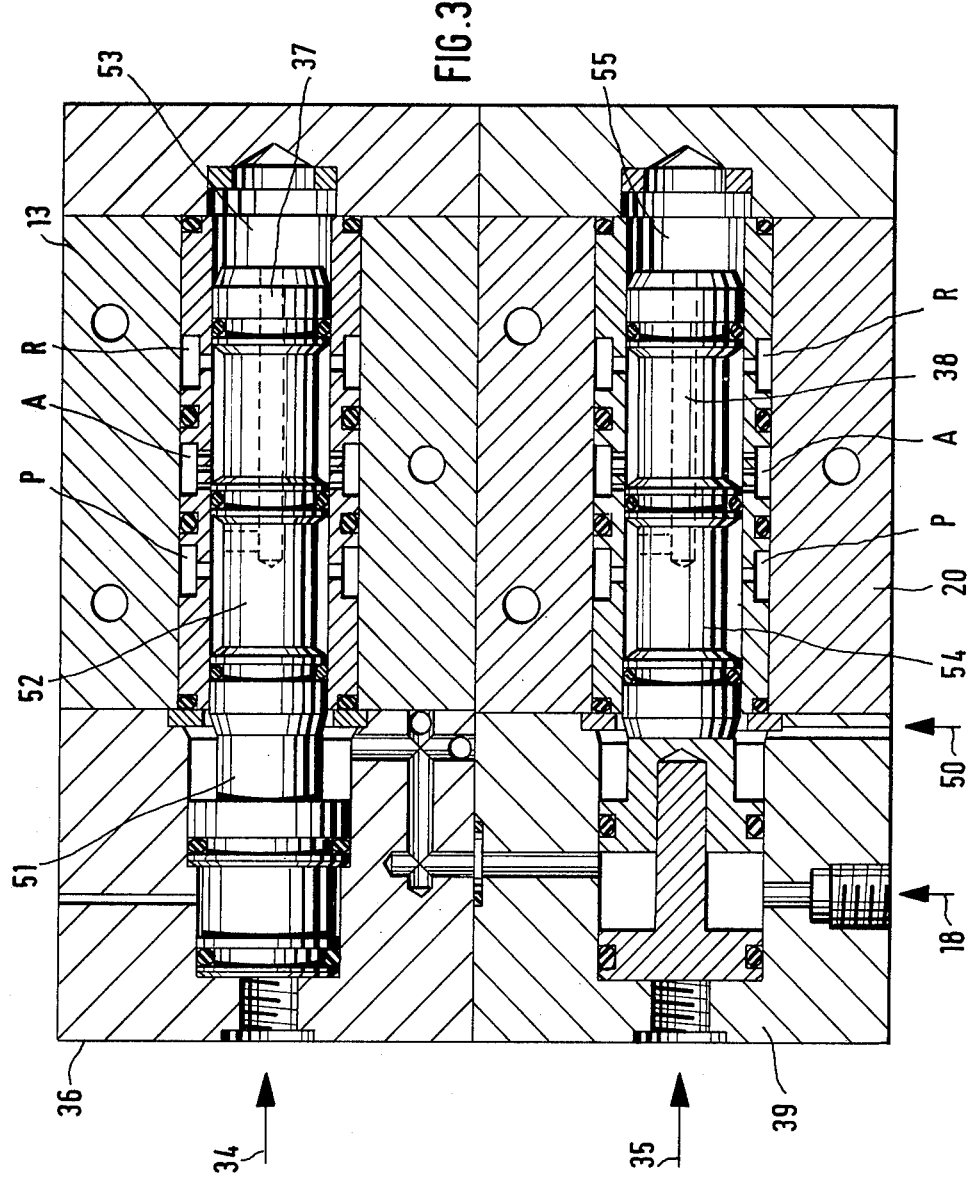

PIPE BURST SAFETY DEVICE FOR NATURAL GAS PIPE LINES OR THE LIKE

BACKGROUND OF THE INVENTION

1. Field of the Invention

The present invention relates generally to natural gas pipe lines or the like, having a flow control valve therein for controlling flow. More particularly, it relates to a unique device that is responsive to a drop in pipe line pressure, such as might occur upon a rupture in the pipe line, to automatically close an upstream flow control valve, utilizing the upstream pressure from the pipe line to do so.

2. Description of the Prior Art

It is customary to partition natural gas pipe lines at regular distances by means of flow control valves, which may be of the ball valve or other selected type, so that when a burst in the pipe line occurs the escape of the natural gas can be stopped by means of a not too distant sealing device. A burst is manifested by a drop in pressure toward the site of the burst, which drop is sensed by suitable control devices and is utilized for the control of the flow control valve that is positioned upstream relative to the side of the burst.

For the purpose of measuring relatively small pressure differences at rather high absolute pressure, the Barton cells are known, and such operate with two measuring bellows exposed to the pressures to be compared. However, Barton cells normally cannot be considered for the present purpose because the control devices must be arranged in open ground along the natural gas pipe line, and diaphragm or bellows switch elements are less suitable than is desirable for the low temperatures often encountered. Moreover, the pressure in a natural gas pipe line is usually rather high for the utilization of such switch elements, so that an interposed pressure-reducing valve would normally be required. This will increase the total cost, and adds to the susceptibility of the device to defects and operating failures.

A control device is also known which operates in the manner of a scanning device, and which compares at regular distances the pressures at two points of the natural gas pipe line. When a difference occurs, a switch for actuating the flow control valve is actuated.

The actuation of the flow control valve requires some outside energy, e.g., electric energy, for producing the hydraulic pressure for a hydraulic actuator or for the direct electrical actuation of the flow control valve. Such devices are sensitive to failures of the energy supply system, and thus could in the case of a pipe burst then at best be operated by hand, which would necessitate the presence of an operator at the flow control valve adjacent to the site of the burst.

SUMMARY OF THE INVENTION

One object of the invention is to avoid the problems associated with prior devices, and in particular to eliminate the dependency of the operation of the pipe burst safety devices upon outside energy systems.

It is the principal object of the present invention to provide a control system for automatically closing a flow control valve in a natural gas pipe line when a burst occurs in the pipe line downstream of the flow control valve, wherein the working pressure of the pipe line is utilized to effect closing of the flow control valve so that the use of an outside source of energy is avoided.

Another object is to provide a pressure differential valve arrangement for effecting closing of a flow control valve in a pipe line, in response to a drop in pipe line pressure downstream of the flow control valve.

Yet another object is to provide a unique pressure differential valve arrangement that is effective to operate a switch valve in response to a pressure drop.

To achieve these objects, the pipe burst safety device according to the invention is constructed in such a way that the actuator can be impinged upon directly by the pressure of the natural gas pipe line. Thus, no additional energy is necessary to set the actuator automatically in motion when a burst in the natural gas pipe line occurs, but on the contrary the natural gas pressure prevailing at the flow control valve is itself utilized for impinging upon the actuator. Consequently, it cannot happen that the flow control valve, due to the failure of any outside energy systems and to the lack of energy resulting therefrom, is not closed in case of a burst. The pipe burst safety device therefore forms, together with the natural gas pipe line, a single closed system.

In the preferred embodiment of the present invention, a differential pressure valve is provided, and is connected so that both sides thereof are impinged upon by the pressure of the natural gas pipe line taken from a point located downstream of a flow control valve. When a drop in pressure on that side of the flow control valve, occurs, the pressure differential valve functions to connect the natural gas pipe line on the other side of the flow control valve, where the working pressure prevails, with the actuator device of the system so that the latter closes the flow control valve.

To put it more precisely, in this embodiment of the invention the pressure of the pipe line located downstream relative to the flow control valve is the one that actuates the flow control valve. The flow control valve and its actuator are so designed that the flow control valve will close when a drop in pressure occurs, the actuator being operated by pressure from the pipe line taken at a point upstream of the flow control valve.

In order to permit the differential pressure valve to become operative when a drop in pressure occurs, a choke and a pressure reservoir arranged between this choke and the differential pressure valve are series connected with one side of the valve so as to precede it. This combination acts in a manner similar to that of an RC element in an electrical circuit, as a delay element, so that a pressure drop is felt on this one side of the pressure differential valve only after a certain delay, the duration of which depends on the adjustment of the choke and the capacity of the pressure reservoir.

The other side of the differential pressure valve is connected to directly sense the pressure drop, without a delay. In this way the differential pressure valve is made responsive to a drop in pressure in the pipe line.

The differential pressure valve is preferably constructed as a slide valve. One of the two cylindrical chambers of the slide valve, normally one with a larger surface area for the pressure to act upon, is connected with the line that contains the choke and the pressure reservoir. The other cylindrical chamber, normally one with a smaller surface area for the pressure to act upon, is directly connected with the natural gas pipe line downstream of the flow control valve. The slide of the slide valve is acted upon by a spring that urges it toward the first chamber, and is constructed to operate a switch valve upon movement of the slide, which switch valve operates to cause the working pressure of the natural gas pipe line from upstream of the flow control valve to be supplied to the actuator, so that the latter closes the flow control valve.

When the gas pipe line is in a normal state and conditions are stationary, both ends of the differential pressure valve receive the same pressure from the pipe line. Because the effective surface area upon which the pressure on the side of the slide that is connected to the pressure line containing the choke and the pressure reservoir is larger, the slide is urged away from this side with a certain force. The spring counteracts this certain force, but it is adjusted in such a way that in the normal state the other terminal position of the slide is maintained against the action of the spring. As the drop in pressure is slowly imparted to the first cylindrical chamber, due to the time constant of the choke and pressure reservoir combination, the situation after a period of time following first sensing of the pressure drop becomes such that the force of the spring predominates, and the spring then moves the slide into the other terminal position, wherein the main control valve of the system is actuated to operate the actuator for closing the flow control valve.

The main control valve of the system is the one that is normally operated to supply pressure to the actuator, for normal operation of the flow control valve. The burst safety device of the invention is preferably connected to work through this main control valve, and is effective to override its normal operation.

The main control valve may comprise two pressure medium actuated, two-position valve elements, by means of which the working pressure of the natural gas pipe line can in each case be transmitted to one of the two inlets of the actuator. In the invention such two-position valve elements are constructed so they can be switched by the working pressure of the natural gas pipe line that is turned-on by operation of the differential pressure valve, in addition to their normal mode of operation.

The invention contemplates the series-connection with one of the two two-position valve elements, so as to precede this element, a normally open switch valve, which is actuated via a line by the working pressure turned-on by the differential pressure valve, and which actuates one of the two two-position valve elements by means of the working pressure tapped via a line at a place preceding the differential pressure valve, while an OR valve is series-connected with the other two-position valve element so as to precede it. At one of the inlets of this OR valve, the working pressure turned-on by the differential pressure valve prevails, and at the other inlet, the working pressure tapped via a line at a place series-connected with the differential pressure valve so as to precede it prevails. The said OR element actuates, by means of the pressure prevailing at one of the inlets, the other two-position valve element. In the lines between the topping place on the natural gas pipe line and the switch valve or OR valve, respectively, check valves may be provided.

By means of this arrangement the pipe burst safety device is integrated into the normal control system of the flow control valve. The check valves and the two two-position valve elements are also necessary to actuate, without the pipe burst safety device of the invention, the actuator of the flow control valve in the desired manner by the use of natural gas pressure. The arrangement of the invention inserts the safety device with the differential pressure valve into this conventional control system, without giving up the functioning thereof.

When the flow control valves serving for partitioning natural gas pipe lines have hydraulic rotary drives, it is advisable that a converting device be inserted between the main control valve and the actuator, wherein the pneumatic pressure of the natural gas pipe line is transmitted to a hydraulic liquid for the purpose of actuating the actuator. In this case it is essential that, without an additional source of energy for the actuation of the flow control valve, a hydraulic liquid with a pressure that corresponds to the natural gas pressure, i.e., e.g., in the order of 75 bar, be available. This is sufficient to actuate the actuator, so that no reinforcement is required.

Other objects and many of the attendant advantages of the present invention will become readily apparent from the following Description of the Preferred Embodiments, when taken in conjunction with the accompanying drawings.

BRIEF DESCRIPTION OF THE DRAWINGS

FIG. 2 is a longitudinal sectional view, taken through the differential pressure valve of FIG. 1; and FIG. 3 is a longitudinal sectional view taken through a valve structure that combines several of the separate valves shown diagrammatically on the right-hand side of FIG. 1.

DESCRIPTION OF THE PREFERRED EMBODIMENTS

Figure 1:
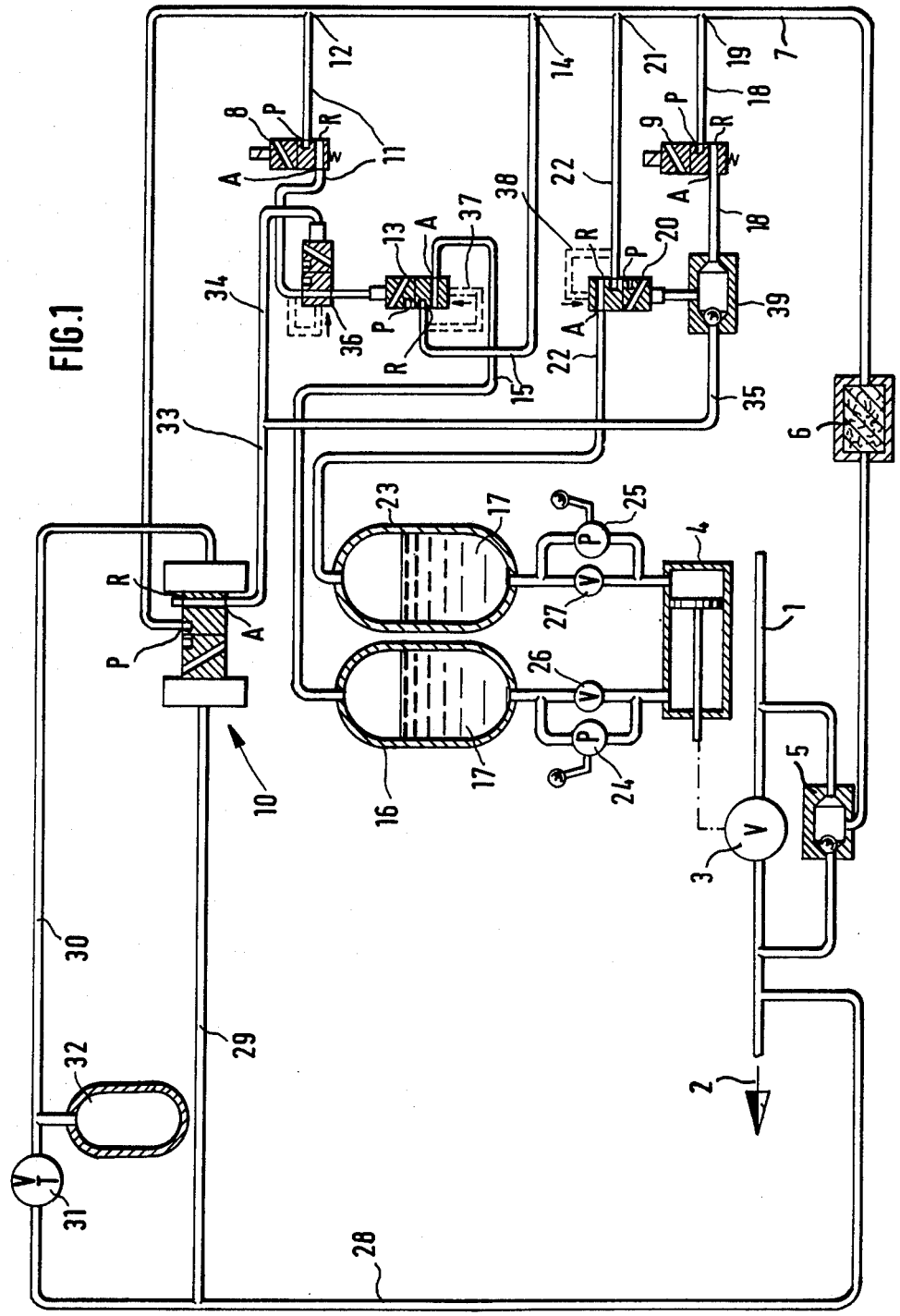
FIG. 1 is a diagrammatic view of the invention, showing a flow control valve connected in a natural gas pipe line, and the pressure differential valve arrangement of the pipe burst safety device utilized for supplying pressure to the actuator of the flow control valve to effect closure thereof in the event of a pipe line rupture.

Referring now to the drawings, a natural gas pipe line is indicated at 1, and contains a flow control valve 3, which can be of the ball or other suitable type, and which is actuated via an actuator 4. The actuator 4 is constructed as a double-acting hydraulic cylinder, the piston rod of which is connected to operate a gear rack which acts upon a pinion connected with the ball flow control valve 3 (not shown), or some other suitable linkage mechanism.

The actuator 4 is directly actuated by the pressure of the natural gas pipe line 1. The natural gas is tapped at two places from the pipe line 1, located above and below the flow control valve 3, and flows by way of an OR valve 5 and a filter 6 into a line 7 which finally leads to a differential pressure valve 10, but which is provided at places preceding this valve 10 with several tapping places.

The actuation of actuator 4 required for the normal opening and closing of flow control valve 3, independently of a pipe burst, is controlled by way of solenoid valves 8 and 9, which are a part of the normal control circuit provided for the system.

Solenoid valve 8 is mounted in a line 11 which leads from a tapping place 12 on line 7 to a two-position main valve element 13. When pressure is imparted via line 11, two-position valve element 13 switches and permits pressure from line 7 to pass from a tapping place 14 via a line 15 into a pressure reservoir 16, wherein the pressure of the natural gas is transmitted to a hydraulic liquid 17 which actuates actuator 4. Solenoid valve 9 is mounted in a line 18 by way of which natural gas pressure tapped at a place 19 on line 7 passes to a second two-position valve element 20 permits natural gas tapped at a tapping place 21 on line 7 to flow via a line 22 into a pressure reservoir 23, wherein as in pressure reservoir 16 the pressure of the natural gas is transformed into the pressure of a hydraulic liquid 17 for the actuation of actuator 4.

Normally, valves 8 and 9 are closed. In an actuation of valve 8, actuator 4 is actuated in such a way that flow control valve 3 is opened. Similarly, in an actuation of valve 9, the flow control valve 3 is closed.

In order to be able to open and close flow control valve 3 even in the case of a failure of the voltage for actuating valves 8 and 9, the feed lines from the pressure reservoirs 16 and 23 to actuator 4 contain hand pumps 24 and 25, respectively, which can, after the closing of valves 26 and 27, convey the hydraulic liquid 17 from the pressure reservoir selectively to one or the other side of actuator 4.

The above part of the description relates only to the normal actuation of flow control valve 3 by means of the pressure of the natural gas pipe line 1, under normal conditions and utilizing either the solenoid valves 8 and 9, or the hand pumps 24 and 25.

The pipe burst safety device of the invention comprises a line 28 by means of which the pressure is conducted from a place on gas pipe line 1 located downstream relative to flow control valve 3, to the two sides of differential pressure valve 10. To one side, in FIG. 1 the left one, of the differential pressure valve 10, the pressure and therewith also a drop in pressure, pass directly by way of a line branch 29. In the other line 30, which in FIG. 1 is connected with the right side of the differential pressure valve 10, a choke 31 as well as a pressure reservoir 32 positioned between this choke and differential pressure valve 10 are inserted. At a drop in pressure in line 28, pressure reservoir 32 therefore maintains the pressure in line 30 at first, the speed of pressure adjustment depending on the capacity of pressure reservoir 32 and the adjustment of choke 31.

Differential pressure valve 10 is constructed, in a manner yet to be described, in such a way that at a drop in pressure sensed in the pipe line 1, it switches, after a delay adjustable by means of choke 31, and then conveys the pressure from line 7 prevailing at a connection P via a connection A to line 33. Line 33 is split into two branches 34 and 35. Branch 34 leads to a pilot valve 36 inserted between solenoid valve 8 and the two-position valve element 13, which pilot valve 36 when switched removes the pressure of actuation from two-position valve element 13, so that the latter, moved by the pressure prevailing by way of branch line 37, returns to the locking position, even when previously actuator 4 was switched so as to open flow control valve 3. When solenoid valve 8 was not actuated, action of pilot valve 36 does not change the switching state of two-position valve element 13.

Hydraulic liquid flows via the other branch line 35 and via an OR valve 39 to the two-position valve element 20 and switches the latter, so that actuator 4 is actuated by the flow of natural gas via line 22 for closing flow control valve 3. This actuation takes place independently of the switching state of solenoid valve 9, which can be closed at the time.

The actuation of actuator 4 which takes place by the switching of the differential pressure valve 10, therefore, overrides all previously set switching states.

In FIG. 2, differential pressure valve 10 is shown in the switching state which occurs at a drop in pressure.

In the normal state, in which the same full working pressure of natural gas pipe line 1 prevails in both lines 29 and 30, piston 41 of the slide generally indicated at 40 abuts against the abutment shoulder or terminal surface 42 which is to the left on FIG. 2. The surface area upon which the pressure fed by way of line 29 in the cylindrical chamber 43 is effective under these conditions corresponds, therefore, only to the surface area, indicated by diameter 44. The surface area upon which the pressure of line 30 prevailing in the right cylindrical chamber 45 is effective is larger, and corresponds to the larger diameter 46, which in turn corresponds to the full diameter of piston 41. Piston 41 is therefore pressed, by the force resulting from the difference in the effective surface areas, against a terminal surface 42 which is on the left in FIG. 2.

This force is large enough to overcome also a spring 47, which strives to pull slide 40, according to FIG. 2, to the right.

At a drop in pressure in gas pipe line 1 downstream of check valve 3, the pressure in cylindrical chamber 43 drops at once. The pressure in cylindrical chamber 45, however, drops only with a certain delay. At a certain moment, however, a state occurs at which the force exerted by the pressure in cylindrical chamber 45 no longer suffices to overcome the force exerted by the residual pressure in cylindrical chamber 43 and by spring 47. Piston 41 is then pulled toward the right by spring 47. A switch valve 48 connected with slide 40 switches at that instance, and permits the natural gas pressure prevailing from line 7 at an inlet P to pass, via an outlet A and line 33, to switch valve 36 or OR valve 39.

As shown in FIG. 3, in the preferred embodiment of the invention, switch valve 36, OR valve 39, and the two, two-position valve elements 13 and 20 are interlocked so as to form a unit. The elements shown in FIG. 3 at the left of separating line 50 represent combinations of valves 36 and 39, shown in FIG. 1, with the actuating elements of two-position valve elements 13 or 20.

When pressure is imparted in line 34 (by the differential pressure valve 10), slide 51 shifts toward the right, and carries slide 52 of two-position valve element 13 along, so that connections P and A of the two-position valve element 13 are connected.

At a drop in pressure in line 34, the pressure of connection P, introduced via a by-pass line 37 into chamber 53, shifts slide 52 to the left again, in which position connections A and P are disconnected.

When pressure is imparted through line 18 or line 35 to the OR valve 39, spindle 54 of the two-position valve element 20 shifts to the right, whereby connections A and P are connected. At the removal of the pressure, the shifting is reversed by way of the pressure introduced through the by-pass line 38 from connection P into chamber 55.

Obviously, many modifications and variations of the invention are possible, without departing from the spirit thereof.

What is claimed is:

1. In a pipe burst safety device for automatically closing a flow control valve connected in a pipe line for transmitting fluid under pressure, wherein in response to a drop in pressure within the pipe line the flow control valve is operated and closed by a fluid actuator means receiving fluid pressure from the pipe line at a location upstream of the flow control valve, the combination of:

a fluid line connected to the pipe line downstream of the flow control valve and having two parallel branches, one of said branches having a pressure drop transmitting delay means connected therein;

a differential pressure valve connected with said two parallel branches, and comprising:

a housing containing two aligned, spaced, generally cylindrical end chambers disposed on opposite sides of an enlarged, generally cylindrical central chamber, each of said end chambers having an inlet port therein, and said end chambers being joined to said generally cylindrical central chamber by abutment shoulders disposed to lie in parallel planes that extend perpendicular to the longitudinal axis of said central chamber;

a slide received within said enlarged central chamber, and movable toward either of said end chambers into sealing engagement with said abutment shoulders, the inlet port of the second of said end chambers being connected with said one branch, and the inlet port of the first of said end chambers being connected with the other of said branches; and resilient means arranged to urge said slide to move toward said second end chamber, said slide normally being shifted toward said first end chamber into sealing engagement with the abutment shoulder there located when said end chambers receive full working pressure from the pipe line, whereby the effective pressure area of said slide presented to said second end chamber is then substantially greater than the effective pressure area presented to said first end chamber; and means controlled by the movements of said slide for controlling the connection of said fluid actuator means to the pipe line, including a switch valve connected between said pipe line and said fluid actuator means and arranged to be operated by the movements of said slide, said switch valve being arranged to be opened when said slide shifts toward said second chamber in response to a drop in pressure in said pipe line transmitted to said differential valve by said fluid line, said fluid actuator means including:

an acutator unit, including a double acting hydraulic cylinder having first and second inlets;

a pair of pressure actuated, two-position main valves connected respectively with said first and said second inlets of said hydraulic cylinders; and means connecting said switch valve with said main valve, arranged to operate said main valves to close said flow control valve when said differential pressure valve senses a drop in pressure in said pipe line downstream of said flow control valve, said two main valves being connected by pipes to said pipe line upstream of the flow control valve for transmitting pressure to said actuator unit.

2. In a pipe burst safety device as recited in claim 1, wherein said switch valve is mechanically connected with said slide to be movable therewith.

3. In a pipe burst safety device as recited in claim 1, wherein said pressure drop transmitting delay means comprises:

a choke connected in said one branch; and a pressure reservoir also connected in said one branch, in series with said choke.

4. In a pipe burst safety device as recited in claim 1, wherein said means connecting said switch valve with the main valves includes:

a normally open switching valve connected in series with one of said main valves, and arranged to actuate said one main valve in response to fluid pressure supplied to said normally open switching valve from said switch valve;

an OR valve connected in series to the other main valve, one inlet of said OR valve being connected to receive pressure from said switch valve, and the other inlet thereof being connected to receive operating pressure from said pipe line; and valve means located in each of said pipes, selectively operable to supply pressure to said actuator unit.

5. In a pipe burst safety device as recited in claim 1, including additionally:

a converter connected between the upstream side of the pipe line and the actuator unit, and arranged to convert pneumatic pressure from said pipe line into hydraulic liquid pressure for actuating said hydraulic cylinder.

* * * * *